No. 881,651. PATENTED MAR. 10, 1908.
J. A. BARBRAKE.
TIRE WIRE PULLING MACHINE.
APPLICATION FILED JULY 3, 1907.

2 SHEETS—SHEET 1.

Witnesses
Harry O. Rastetter
Mary A. Cavanaugh

Inventor
J. Albert Barbrake
By Harry Frease
Attorney

No. 881,651. PATENTED MAR. 10, 1908.
J. A. BARBRAKE.
TIRE WIRE PULLING MACHINE.
APPLICATION FILED JULY 3, 1907.

2 SHEETS—SHEET 2.

Witnesses
Harry O. Rastetter
Mary A. Cavanaugh

Inventor
J. Albert Barbrake,
By Harry Frease.
Attorney

UNITED STATES PATENT OFFICE.

JOHN ALBERT BARBRAKE, OF CANTON, OHIO.

TIRE-WIRE-PULLING MACHINE.

No. 881,651.　　　　　Specification of Letters Patent.　　　Patented March 10, 1908.

Application filed July 3, 1907. Serial No. 382,030.

*To all whom it may concern:*

Be it known that I, JOHN ALBERT BARBRAKE, a subject of the Emperor of Germany, residing at Canton, in the county of Stark and State of Ohio, have invented a a new and useful Tire-Wire-Pulling Machine, of which the following is a specification.

My invention relates to a machine for pulling out the wires which are usually employed and located longitudinally in rubber tires, when it is necessary or desirable to withdraw the wires for making repairs or for other purposes; and the objects of the improvement are, in general, to provide a machine for wrapping the wire around a spindle as it is withdrawn from the tire, and in particular, to provide means for connecting the end of the wire to the spindle, for laterally adjusting the tire as the wire is being withdrawn, and for readily removing the wire from the spindle when it is wrapped thereon.

Figure 1:
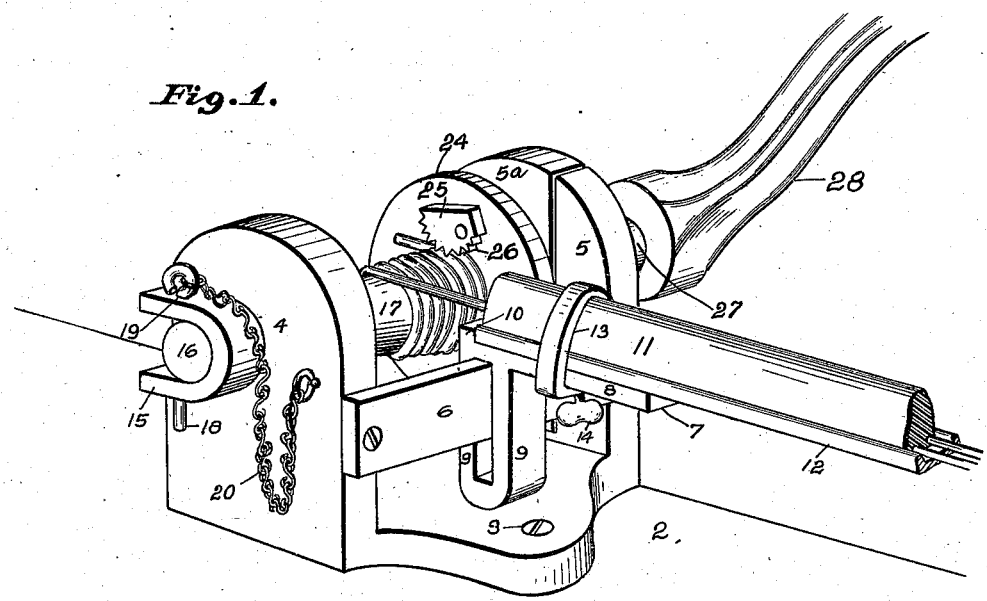
Figure 2:
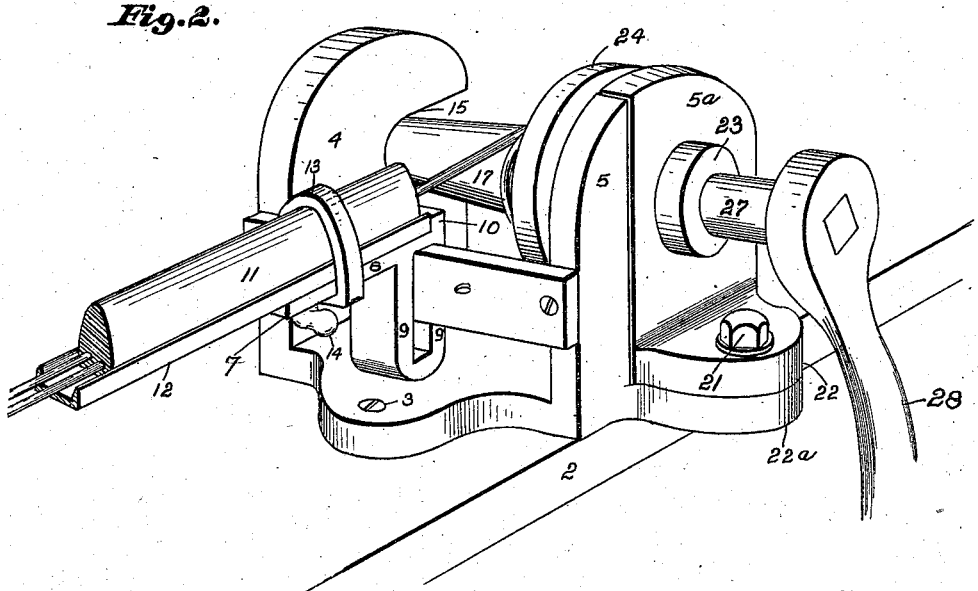

These objects are attained by the construction, mechanism and arrangement illustrated in the accompanying drawings, in which—
Figure 1 is a right-front perspective view of the machine in use; Fig. 2, a left-front perspective view of the machine in use; and Fig. 3, a right-rear perspective view of the machine showing the method of removing wrapped wire from the spindle.

Similar numerals refer to similar parts throughout the drawings.

The frame 1 of the machine may be attached to the bench or table 2, or to any other suitable support, as by means of the screws 3, and the upright standards 4 and 5 are formed or attached on opposite sides of the frame. The transverse bar 6 is formed or attached on the forward sides of the standards and is preferably rectangular in form. The supporting bracket 7 is composed of the flat plate 8 which rests on the transverse bar, and the depending guides 9 which abut the forward and rear sides of the bar, by means of which the supporting bracket is adapted to be adjusted laterally by sliding along the transverse bar. At the forward end of the supporting bracket is preferably provided the upright transverse flange 10. A convenient way for connecting the rubber tire 11 with the machine is to place the tire in a section of channel bar 12 which in turn is placed upon the flat plate of the supporting bracket with the ends of the tire and channel bar abutting the transverse upright flange of the bracket; and then to firmly secure all these parts together by means of the clamp 13 and the thumb screw 14, which screw is adapted to operate against the lower side of the flat plate.

Figure 3:
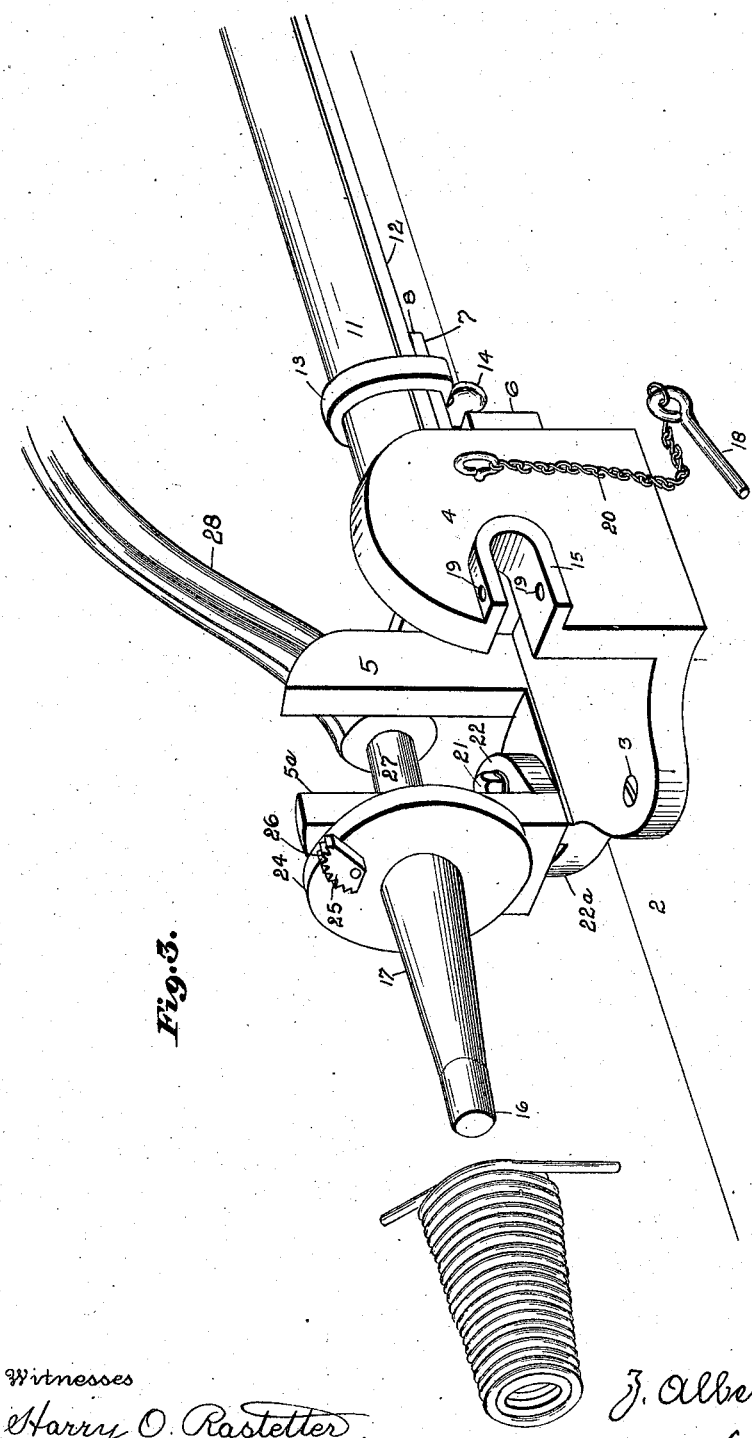

In the upright standard 4 on one side of the machine is provided the journal bearing 15 for the free end 16 of the spindle 17, this bearing being substantially U-shaped in form, open on the rear side; and the journal of the spindle is preferably held in proper place by means of the key pin 18 passed through the aperture 19 in the rearward wings of the bearing; and this pin may be connected with the machine as by means of the chain 20 to prevent its being lost or mislaid. The separate section 5ª of the upright standard on the opposite side of the machine is pivotally connected with the frame as by means of the vertical pivot bolt 21 passed through the ear 22 formed on the separate section and the ear 22ª formed on the frame. The journal 23 for the pivoted end of the spindle is formed in the separate pivoted section of the upright standard, 5ª, so that when the key pin 18 is removed to release the free end of the spindle the same can be rotated horizontally on the pivoted standard section, thus disengaging the free end of the spindle from its bearing, as shown in Fig. 3.

The body of the spindle is preferably made slightly cone-shaped in form, tapered from a larger diameter at the pivoted bearing to a smaller diameter at the free end, so that when the wire has been wrapped on the spindle it can more readily be removed therefrom toward its free smaller end, but this form of construction is not essential. The flange 24 is preferably provided on the spindle at or near the pivoted standard on which flange is pivotally mounted the cam dog 25 which is preferably provided with the teeth 26 on its peripheral face. This dog is so located and proportioned that it is adapted to grip the wire between its peripheral face and the adjacent side of the spindle, as shown in Fig. 1. The end of the spindle shaft 27 is extended a short distance outside of the pivoted standard and the crank 28 is mounted on this extended end, by means of which the spindle is operated.

For use, the rubber tire is clamped on the supporting bracket, which is laterally adjusted to a point opposite the gripping dog, whereupon the protruding end of the wire is gripped between the dog and the adjacent side of the spindle. The wire is then withdrawn from the tire by a proper rotation of the spindle by means of its crank, as shown in Fig. 1, in doing which the wire is wrapped around the spindle, and the supporting bracket is adapted to be adjusted by sliding laterally on the transverse bar to follow the spiral formed by the wire on the spindle. When the coils of the wire have covered the spindle the wire can be wrapped in the reverse direction to form new coils on top of the first ones formed, as shown in Fig. 3. When the wire has been withdrawn from the tire the retaining key for the free end of the spindle is removed, whereupon the spindle is rotated on its pivoted bearing-standard and the wire can readily be removed therefrom as shown in Fig. 3.

What I claim as my invention, and desire to secure by Letters Patent, is—

1. A tire-wire pulling machine comprising a frame with two standards thereon, an open bearing in one standard and a pivoted bearing in the other standard, a tapered spindle in the bearings adapted to be swung with the pivoted bearing to swing its free end out of the open bearing, an adjacent tire-supporting bracket, and means for connecting the tire-wire with the spindle.

2. A tire-wire pulling machine comprising a frame with two standards thereon, an open bearing in one standard and a pivoted bearing in the other standard, a spindle in the bearings adapted to be swung with the pivoted bearing to swing its free end out of the open bearing, an adjacent tire-supporting bracket, and means for connecting the tire-wire with the spindle.

3. A tire-wire pulling machine comprising a frame with two standards thereon, an open bearing in one standard and a pivoted bearing in the other standard, and a tapered spindle in the bearings adapted to be swung with the pivoted bearing to swing its free end out of the open bearing.

4. A tire-wire pulling machine comprising a frame with two standards thereon, an open bearing in one standard and a pivoted bearing in the other standard, and a spindle in the bearings adapted to be swung with the pivoted bearing to swing its free end out of the open bearing.

J. ALBERT BARBRAKE.

Witnesses:
HARRY FREASE,
MARY A. CAVANAUGH.